Dec. 17, 1957  G. LANGE  2,816,482
INTERCHANGEABLE LENS SYSTEM FOR PHOTOGRAPHIC PURPOSES
Filed Nov. 19, 1956  4 Sheets-Sheet 1
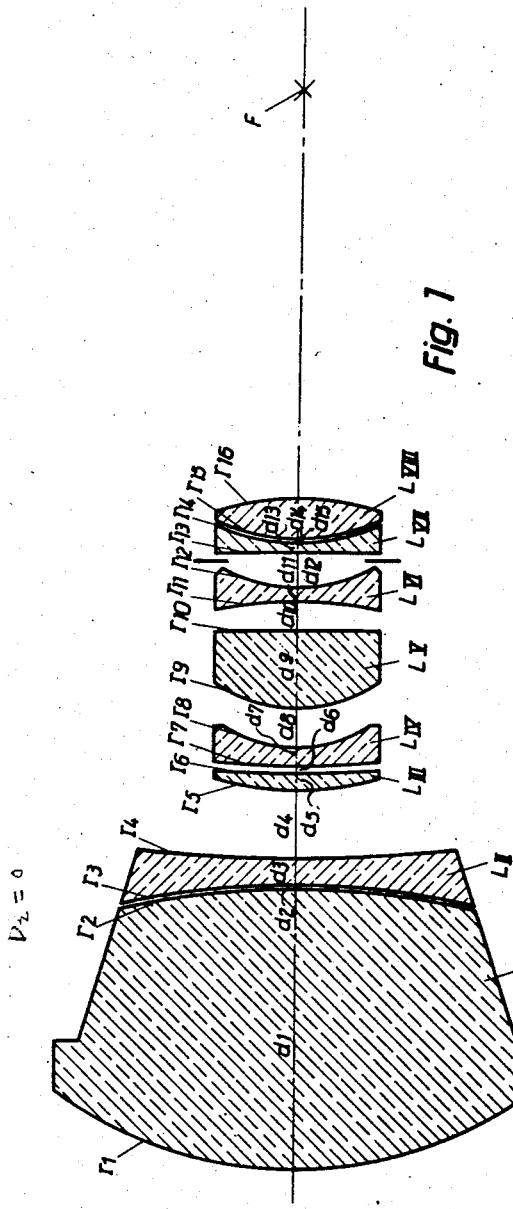
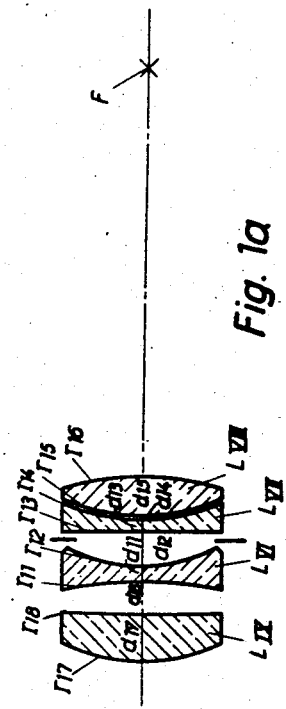

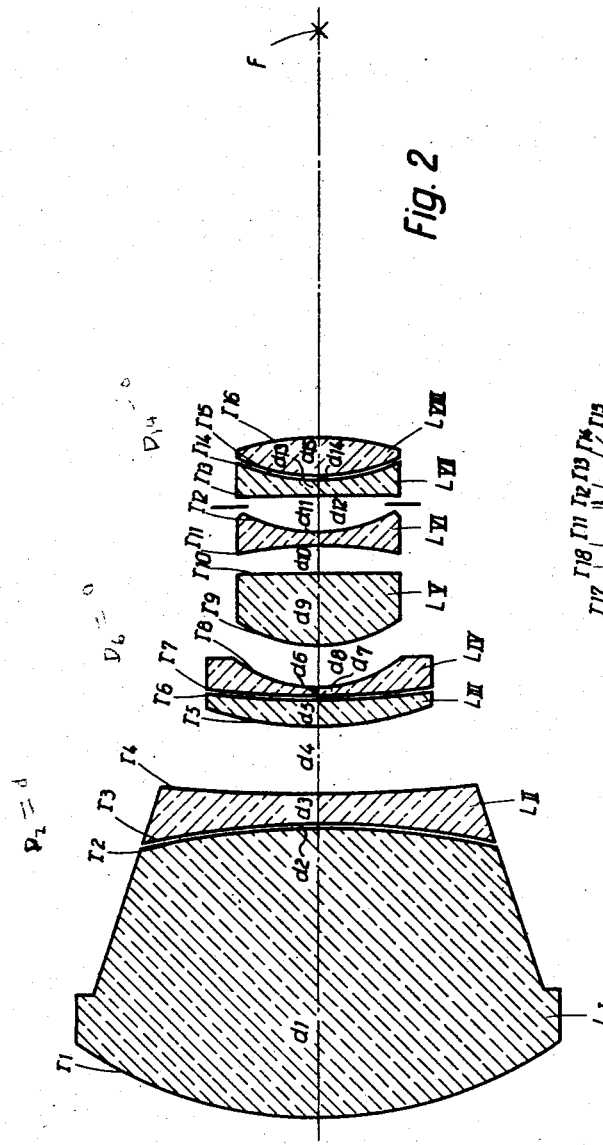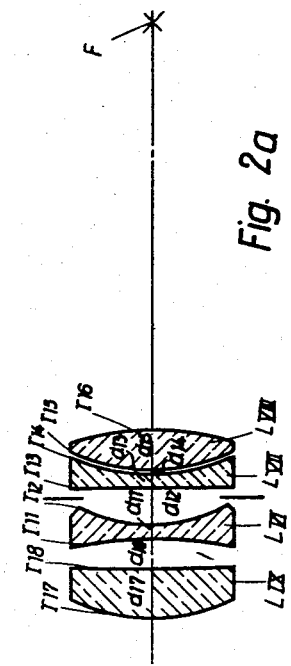

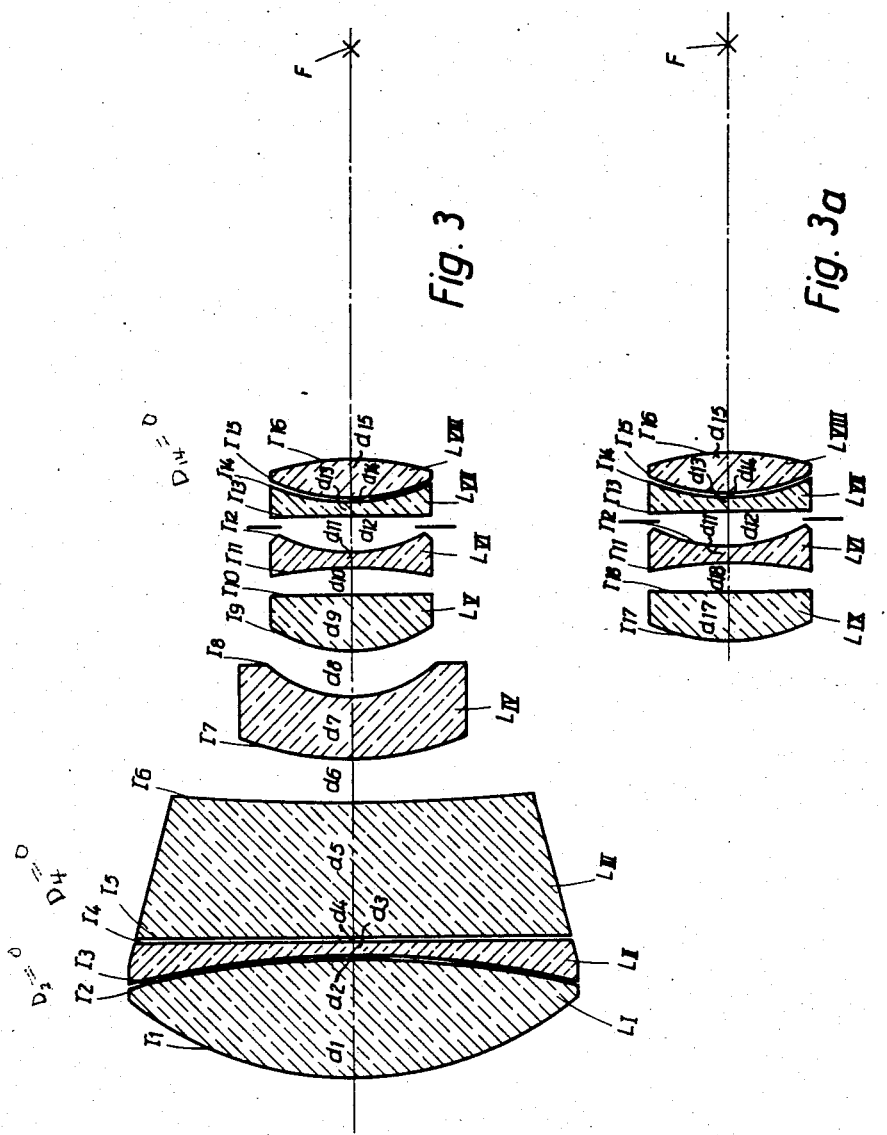

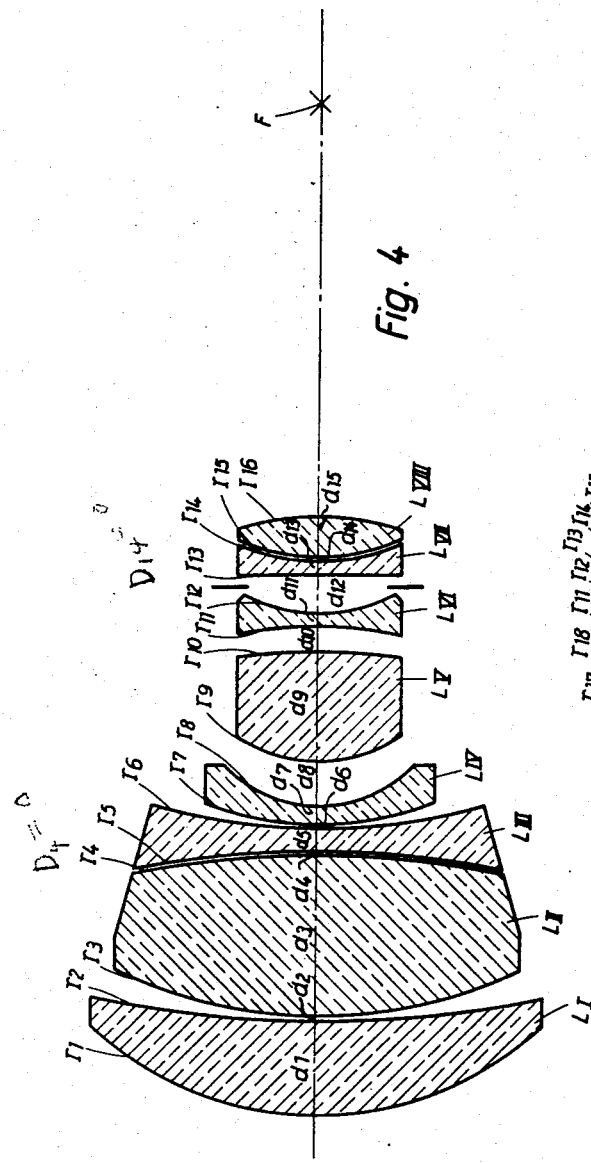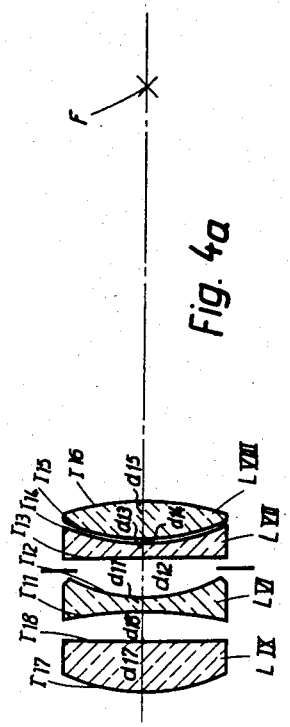

United States Patent Office 2,816,482
Patented Dec. 17, 1957

2,816,482

INTERCHANGEABLE LENS SYSTEM FOR PHOTOGRAPHIC PURPOSES

Günther Lange, Koenigsbronn, Wurttemberg, Germany, assignor to Carl Zeiss, Heidenheim (Brenz), Wurttemberg, Germany Application November 19, 1956, Serial No. 623,262

Claims priority, application Germany November 19, 1955

14 Claims. (Cl. 88—57)

The invention concerns an interchangeable lens system for photographic purposes which can be substituted for the front component of a basic three-component photo-objective consisting of a collective front component, a bi-concave middle component and a collective rear component in such a way that together with the two remaining components consisting of the middle component and the rear component of the basic objective it forms an objective which with equal focal intercept shows a greater focal length than the basic objective.

Telescopic attachments which can be placed in front of the complete objective and which in conjunction with it form an objective of greater focal length and of equal focal intercept are of prior art. If however the front component is removed and replaced by a lens system such that it forms with the remaining components of the basic objective an objective of equal focal intercept and of greater focal length then better correction can be achieved.

It would indeed be possible to go one step further and to remove the middle component also and to aim at the task of designing a lens system such that it can replace both the components of the basic objective standing in front of the diaphragm and that it then forms together with the collective component standing behind the diaphragm an objective of different focal length but of equal focal intercept. Such a procedure has on the one hand the advantage that one can place the interchangeable lens system even closer to the diaphragm but on the other hand it has the disadvantage that the air space containing the diaphragm and the shutter sectors is exposed during the interchange of the components so that the danger arises that dust or humidity may penetrate there. For this reason it is advisable to leave the middle component standing in place and to take the alternative which led to the system according to the invention.

The invention is characterized by the following points in their entirety:

(a) The system replacing the front lens of the basic objective contains at least three components separated from each other by air spaces;

(b) In at least one of the air spaces both boundary surfaces have curvatures concave towards the diaphragm of the basic objective wherein the radii of both these surfaces lie within the limits $0.12 \times f$ and $0.28 \times f$ ($f$=the focal length of the entire objective consisting of the lens system plus the remaining components of the basic objective) and wherein the radius of the surface bounding the said air space on the image side is at least 0.8 times but at most 2.5 times as long as the radius of the surfaces bounding the air space on the object side;

(c) The length of this air space lies within the limits $0.02 \times f$ and $0.15 \times f$, it is also smaller than twice the axial separation of the surface bounding the said air space on the image side from the last surface of the interchangeable lens system wherein this separation in turn lies between the limits $0.03 \times f$ and $0.30 \times f$;

(d) The component standing in front of the air space is dispersive;

(e) The ray coming from infinity parallel to the axis has a negative intercept within this air space;

(f) The sum of the refractive powers of all the surfaces standing in front of the said air space is negative and lies within the limits $-4.0 \times 1/f$ and $-1.0 \times 1/f$;

(g) The sum of the refractive powers of the two surfaces bounding the said air space is also negative and lies between the limits $-3.0 \times 1/f$ and $-0.1 \times 1/f$;

(h) The sum of the refractive powers of the surfaces of the system which follow the said air space is positive and lies between the limits $1.5 \times 1/f$ and $6.0 \times 1/f$.

It is advisable to select the sum of the refractive powers of the surfaces bounding the air space even smaller than $-0.3 \times 1/f$.

It is therein an advantage to select the radius of the surface bounding the said air space on the object side smaller than the radius of the surface bounding the air space on the image side.

It is a further advantage to give to the surface which shows the strongest collective refractive power a radius of curvature within the limits $0.30 \times f$ and $0.48 \times f$ and to select the axial separation of this surface from the surface bounding the said air space on the object side within the limits $0.015 \times f$ and $0.15 \times f$.

A good state of correction may already be attained if only one single component more particularly one collective component follows the said air space in this system.

For the flattening of the image field it is advisable to select the glasses such that the arithmetical mean of the $n$-values of all the collective lenses of the system is smaller than the arithmetical mean of the $n$-values of all the dispersive lenses.

Within the framework indicated by the above conditions there are several possibilities for constructing a system of the kind required. In the accompanying Figures 1 to 4 there are represented several objectives which are combined from such lens systems and from the remaining components of a three component objective wherein for each figure the basic objective belonging to it (with its shorter focal length) is given in the accompanying Figures 1a to 4a. In all these examples the focal length of the objective consisting of the interchangeable system and of the two remaining components of the basic objective is 1.6 times as long as the focal length of the basic objective proper.

The interchangeable lens system in the objective according to Fig. 1 consists of five lenses wherein the first, third and fifth lens are collective while the second and fourth lens are dispersive wherein furthermore the first and the second lens are united by a cemented surface to form a collective meniscus-shaped component while the last, fifth lens is an unsymmetrically bi-convex lens which turns the surface with the longer radius towards the remaining components of the basic objective. The third and fourth lens are therein uncemented menisci which turn their hollow surfaces towards the remaining components of the basic objective.

The lens system according to the invention in the objective according to Figure 2 differs significantly from the system according to Figure 1 in that the third and fourth lens are united by a cemented surface wherein the cemented component so formed has a dispersive effect.

The lens system according to the invention in the objective according to Figure 3 contains five lenses wherein th first and the fifth lens are dispersive. In this embodiment the $n$-value of the second lens is greater than the arithmetical mean of the $n$-values of the two neighbouring lenses and the $v$-value of the second lens is greater than the $v$-value of the third lens. Furthermore the first second and third lens are united by cemented surfaces to form a meniscus-shaped collective member.

The lens system according to the invention in the objective according to Figure 4 also contains five lenses wherein however the first, the second and the fifth lens are collective and the third and the fourth lens are dispersive. In this embodiment the second and the third lens are united by a cemented surface to form a collective meniscus-shaped component. Therein the air space between the first and the second component is smaller than 5% of the focal length of the entire objective.

For the lens system according to the Figures 1 to 4 there has been selected the same basic objective in each case and more particularly the first component therein is an uncemented collective lens, the second component is an uncemented biconcave dispersive lens and the third member is a collective component consisting of two lenses of opposing refractive powers cemented together.

In the embodiments described above the same type has consistently been used as the basic objective. In the Figures 1 to 4 the values for the remaining components are therefore the same throughout. The systems according to the invention may however also be computed for other basic objectives while maintaining their characteristic qualities as long as these objectives consist of three components more particularly of a collective front component of a biconcave middle component and of a collective rear component.

It should be noted that in the figures the spaces filled with cement in the cemented components are represented as having finite thickness. In the corresponding tables of numerical values however given in the following the thicknesses corresponding to the spaces where two lenses are cemented together are given with the value "Nil."

In the following Tables I to IV the numerical values for the objectives according to the invention represented in the embodiments according to the Figures 1 to 4 are given with the focal length increased by comparison with the basic objective while in the Table V the numerical values for the basic objective proper are given.

In these tables there are designated:

By L the lenses
By r the radii of the surfaces
By d the axial separations (thicknesses and air spaces)
By $n_d$ the refractive indices, and
By $v$ the Abbe numbers.

Table I
$[f=1.0.]$

| Lenses | Radii | Separations | $n_d$ | $v$ |
|---|---|---|---|---|
| $L_I$ | $r_1 = +0.51027$ | $d_1 = 0.3549$ | 1.56873 | 63.1 |
|  | $r_2 = -0.99641$ | $d_2 = 0$ |  |  |
| $L_{II}$ | $r_3 = -0.99641$ | $d_3 = 0.0355$ | 1.74400 | 44.9 |
|  | $r_4 = +1.98809$ | $d_4 = 0.0822$ |  |  |
| $L_{III}$ | $r_5 = +0.37180$ | $d_5 = 0.0195$ | 1.51742 | 52.2 |
|  | $r_6 = +1.67273$ | $d_6 = 0.0118$ |  |  |
| $L_{IV}$ | $r_7 = +1.07075$ | $d_7 = 0.0237$ | 1.72825 | 28.3 |
|  | $r_8 = +0.17093$ | $d_8 = 0.0520$ |  |  |
| $L_V$ | $r_9 = +0.18500$ | $d_9 = 0.0894$ | 1.68893 | 31.3 |
|  | $r_{10} = -7.05401$ | $d_{10} = 0.0355$ |  |  |
| $L_{VI}$ | $r_{11} = -0.49939$ | $d_{11} = 0.0160$ | 1.62536 | 35.6 |
|  | $r_{12} = +0.20169$ | $d_{12} = 0.0483$ |  |  |
| $L_{VII}$ | $r_{13} = -5.68444$ | $d_{13} = 0.0142$ | 1.54869 | 45.4 |
|  | $r_{14} = +0.25029$ | $d_{14} = 0$ |  |  |
| $L_{VIII}$ | $r_{15} = +0.25029$ | $d_{15} = 0.0533$ | 1.72000 | 50.3 |
|  | $r_{16} = -0.33860$ |  |  |  |

Table II
$[f=1.0.]$

| Lenses | Radii | Separations | $n_d$ | $v$ |
|---|---|---|---|---|
| $L_I$ | $r_1 = +0.50329$ | $d_1 = 0.3669$ | 1.56873 | 63.1 |
|  | $r_2 = -1.01816$ | $d_2 = 0$ |  |  |
| $L_{II}$ | $r_3 = -1.01816$ | $d_3 = 0.0355$ | 1.74400 | 44.9 |
|  | $r_4 = +1.98809$ | $d_4 = 0.0822$ |  |  |
| $L_{III}$ | $r_5 = +0.41717$ | $d_5 = 0.0355$ | 1.72000 | 50.3 |
|  | $r_6 = +1.07075$ | $d_6 = 0$ |  |  |
| $L_{IV}$ | $r_7 = +1.07075$ | $d_7 = 0.0118$ | 1.72825 | 28.3 |
|  | $r_8 = +0.16981$ | $d_8 = 0.0515$ |  |  |
| $L_V$ | $r_9 = +0.18367$ | $d_9 = 0.0875$ | 1.68893 | 31.3 |
|  | $r_{10} = -7.05401$ | $d_{10} = 0.0355$ |  |  |
| $L_{VI}$ | $r_{11} = -0.49939$ | $d_{11} = 0.0160$ | 1.62536 | 35.6 |
|  | $r_{12} = +0.20169$ | $d_{12} = 0.0483$ |  |  |
| $L_{VII}$ | $r_{13} = -5.68444$ | $d_{13} = 0.0142$ | 1.54869 | 45.4 |
|  | $r_{14} = +0.25029$ | $d_{14} = 0$ |  |  |
| $L_{VIII}$ | $r_{15} = +0.25029$ | $d_{15} = 0.0533$ | 1.72000 | 50.3 |
|  | $r_{16} = -0.33860$ |  |  |  |

Table III
$[f=1.0.]$

| Lenses | Radii | Separations | $n_d$ | $v$ |
|---|---|---|---|---|
| $L_I$ | $r_1 = +0.45119$ | $d_1 = 0.1521$ | 1.56873 | 63.1 |
|  | $r_2 = -1.15064$ | $d_2 = 0$ |  |  |
| $L_{II}$ | $r_3 = -1.15064$ | $d_3 = 0.0178$ | 1.72000 | 50.3 |
|  | $r_4 = \infty$ | $d_4 = 0$ |  |  |
| $L_{III}$ | $r_5 = \infty$ | $d_5 = 0.1776$ | 1.75520 | 27.5 |
|  | $r_6 = +2.61325$ | $d_6 = 0.0462$ |  |  |
| $L_{IV}$ | $r_7 = +0.38266$ | $d_7 = 0.0786$ | 1.75192 | 34.8 |
|  | $r_8 = +0.16136$ | $d_8 = 0.0542$ |  |  |
| $L_V$ | $r_9 = +0.16965$ | $d_9 = 0.0711$ | 1.59551 | 39.2 |
|  | $r_{10} = -17.2164$ | $d_{10} = 0.0355$ |  |  |
| $L_{VI}$ | $r_{11} = -0.49939$ | $d_{11} = 0.0160$ | 1.62536 | 35.6 |
|  | $r_{12} = +0.20169$ | $d_{12} = 0.0483$ |  |  |
| $L_{VII}$ | $r_{13} = -5.68444$ | $d_{13} = 0.0142$ | 1.54869 | 45.4 |
|  | $r_{14} = +0.25029$ | $d_{14} = 0$ |  |  |
| $L_{VIII}$ | $r_{15} = +0.25029$ | $d_{15} = 0.0533$ | 1.72000 | 50.3 |
|  | $r_{16} = -0.33860$ |  |  |  |

Table IV
[$f=1.0$.]

| Lenses | Radii | Separations | $n_d$ | $v$ |
|---|---|---|---|---|
| $L_I$ | $r_1 = +0.41633$ | | | |
| | | $d_1 = 0.1184$ | 1.50378 | 66.7 |
| | $r_2 = +1.40746$ | | | |
| | | $d_2 = 0.0012$ | | |
| | $r_3 = +0.59353$ | | | |
| $L_{II}$ | | $d_3 = 0.2072$ | 1.50378 | 66.7 |
| | $r_4 = -1.1842$ | | | |
| | | $d_4 = 0$ | | |
| | $r_5 = -1.1842$ | | | |
| $L_{III}$ | | $d_5 = 0.0296$ | 1.75192 | 34.8 |
| | $r_6 = +0.74720$ | | | |
| | | $d_6 = 0.0012$ | | |
| | $r_7 = +0.39101$ | | | |
| $L_{IV}$ | | $d_7 = 0.0237$ | 1.74400 | 44.9 |
| | $r_8 = +0.16256$ | | | |
| | | $d_8 = 0.0533$ | | |
| | $r_9 = +0.18236$ | | | |
| $L_V$ | | $d_9 = 0.1390$ | 1.57501 | 41.3 |
| | $r_{10} = -0.77457$ | | | |
| | | $d_{10} = 0.0296$ | | |
| | $r_{11} = -0.49939$ | | | |
| $L_{VI}$ | | $d_{11} = 0.0160$ | 1.62536 | 35.6 |
| | $r_{12} = +0.20169$ | | | |
| | | $d_{12} = 0.0483$ | | |
| | $r_{13} = -5.68444$ | | | |
| $L_{VII}$ | | $d_{13} = 0.0142$ | 1.54869 | 45.4 |
| | $r_{14} = +0.25029$ | | | |
| | | $d_{14} = 0$ | | |
| | $r_{15} = +0.25029$ | | | |
| $L_{VIII}$ | | $d_{15} = 0.0533$ | 1.72000 | 50.3 |
| | $r_{16} = -0.33860$ | | | |

Table V.—Basic objective
$$\left[ f = \frac{1\ 0}{1.6} \right]$$

| Lenses | Radii | Separations | $n_d$ | $v$ |
|---|---|---|---|---|
| $L_{IX}$ | $r_{17} = +0.23292$ | | | |
| | | $d_{17} = 0.0608$ | 1.69100 | 54.8 |
| | $r_{18} = +3.63868$ | | | |
| | | $d_{18} = 0.0365$ | | |
| | $r_{11} = -0.49939$ | | | |
| $L_{VI}$ | | $d_{11} = 0.0160$ | 1.62536 | 35.6 |
| | $r_{12} = +0.20169$ | | | |
| | | $d_{12} = 0.0483$ | | |
| | $r_{13} = -5.68444$ | | | |
| $L_{VII}$ | | $d_{13} = 0.0142$ | 1.54869 | 45.4 |
| | $r_{14} = +0.25029$ | | | |
| | | $d_{14} = 0$ | | |
| | $r_{15} = +0.25029$ | | | |
| $L_{VIII}$ | | $d_{15} = 0.0533$ | 1.72000 | 50.3 |
| | $r_{16} = -0.33860$ | | | |

I claim:
1. An interchangeable lens system for photographic purposes which can be substituted for the front component of a basic three-component photo-objective consisting of a collective front component, a biconcave middle component, and a collective rear component in such a way that in conjunction with the two remaining components consisting of the middle component and the rear component of the basic objective it forms an objective which with equal focal intercept shows a greater focal length than the basic objective and which system is characterized by the following additional characteristics and comprising at least three components separated from each other by air spaces, and in at least one of the air spaces both boundary surfaces showing hollow curvatures turned towards the diaphragm of the basic objective wherein the radii of both these surfaces lie within the limits $0.12 \times f$ and $0.28 \times f$, $f$ being the focal length of the entire objective consisting of the lens system plus the remaining components of the basic objective, the radius of the surface bounding the said air space on the image side being at least 0.8 times but at most 2.5 times as long as the radius of the surface bounding the air space on the object side, and the length of this air space lying within the limits $0.02 \times f$ and $0.15 \times f$ and being also smaller than twice the axial separation of the surface bounding the said air space on the image side from the last surface of the interchangeable lens system wherein this separation in turn lies within the limits $0.03 \times f$ and $0.30 \times f$, and the component in front of the air space being dispersive, the ray coming from infinity parallel to the axis having a negative intercept within this air space, the sum of the refractive powers of all the surfaces standing in front of the said air space being negative and lying within the limits $-4.0 \times 1/f$ and $-1.0 \times 1/f$, the sum of the refractive powers of the two surfaces bounding the said air space being also negative and lying within the limits $-3.0 \times 1/f$ and $-0.1 \times 1/f$, the sum of the refractive powers of the surfaces of the system following the said air space being positive and lying within the limits $1.5 \times 1/f$ and $6.0 \times 1/f$.

2. In a lens system according to claim 1 the sum of the refractive powers of the surfaces bounding the said air space being less than $-0.3 \times 1/f$.

3. In a lens system according to claim 1 the radius of the surfaces bounding the said air space on the object side being smaller than the radius of the surface bounding the space on the image side.

4. In a lens system according to claim 1 the surface of the system showing the strongest collective refractive power having a radius of curvature within the limits $0.30 \times f$ and $0.48 \times f$ and showing an axial separation from the surface bounding the said air space on the object side within the limits $0.015 \times f$ and $0.15 \times f$.

5. In a lens system according to claim 1 one single component more particularly a collective component following upon the said air space.

6. In a lens system according to claim 1 the arithmetical mean of the $n$-values of all the collective lenses in the system being less than the arithmetical means of the $n$-values of all the dispersive lenses.

7. A lens system according to claim 1 consisting of five lenses the first, the third and the fifth lens being collective and the second and the fourth lens being dispersive, the first and second lens being united by a cemented surface thus forming one collective meniscus-shaped component, the last, fifth lens being an unsymmetrical biconvex lens turning the surface with the longer radius towards the remaining components of the basic objective.

8. A lens system according to claim 1 consisting of five lenses the first, the third and the fifth lens being collective and the second and the fourth lens being dispersive, the first and second lens being united by a cemented surface thus forming one collective meniscus-shaped component, the last, fifth lens being an unsymmetrical biconvex lens turning the surface with the longer radius towards the remaining components of the basic objective, the third and the fourth lens being uncemented menisci turning their concave surfaces towards the remaining components of the basic objective.

9. A lens system according to claim 1 consisting of five lenses the first, the third and the fifth lens being collective and the second and the fourth lens being dispersive, the first and second lens being united by a cemented surface thus forming one collective meniscus-shaped component, the last, fifth lens being an unsymmetrical biconvex lens turning the surface with the longer radius towards the remaining components of the basic objective, the third and the fourth lens being united by a cemented surface, the cemented component so formed having a dispersive effect.

10. A lens system according to claim 1 containing five lenses, the first and the fifth lens being collective and the second third and fourth lens being dispersive.

11. In a lens system according to claim 1 the first, the second and the third lens being united by cemented surfaces to form one meniscus-shaped collective component, and the $n$-values of the neighbouring lenses and the $v$-value of the second lens being greater than the $v$-value of the third lens.

12. A lens system according to claim 1 containing five lenses the first, the second and the fifth being collective and the third and fourth lens being dispersive.

13. A lens system according to claim 1 containing five lenses the first, the second and the fifth being collective and the third and fourth lens being dispersive, the second and the third lens being united by a cemented surface to form a collective meniscus-shaped component.

14. A lens system according to claim 1 containing five lenses the first, the second and the fifth being collective and the third and fourth lens being dispersive, the second and the third lens being united by a cemented surface to form a collective meniscus-shaped component, the first air space being less than 5% of the focal length of the complete objective.

References Cited in the file of this patent

UNITED STATES PATENTS

| | | |
|---|---|---|
| 2,662,447 | Tronnier | Dec. 15, 1953 |
| 2,780,139 | Lange | Feb. 5, 1957 |

FOREIGN PATENTS

| | | |
|---|---|---|
| 472,234 | Germany | Mar. 5, 1929 |
| 722,520 | Germany | July 11, 1942 |
| 1,102,390 | France | May 4, 1955 |
| 1,106,793 | France | July 27, 1955 |